(12) United States Patent
McConnel

(10) Patent No.: X7326
(45) Date of Patent: Dec. 13, 1832

(54) WATER WHEEL

(76) Inventor: James McConnel

James McConnel
Letters Patent.

The Schedule referred to in these Letters Patent and making
part of the same, containing a description in the words of the said
James McConnel himself of his improvement in the Water Wheel.

To all people to whom these presents shall come.
Be it known that I James McConnel of Shenango Township in the
County of Mercer & State of Pennsylvania have invented a new &
useful improvement upon the Water Wheel for propelling Mills
& other Machinery, & that the following is a full & exact description
of the construction & operation of the said water-wheel as invented
or improved by me, viz. The wheel is a horizontal one & calculated
to run in back water, with a velocity & power believed to be superior to
that of any back-water wheel now known or used. The wheel is
constructed in the following manner. The proportion however,
may be varied to suit the fancy or judgment of the operator, or to
accom̄odate the head of water to be used; to wit... For a head & fall
of two feet water; let the wheel be five feet in diameter, within
the rim of the wheel & fourteen inches deep. The buckets or floats
may be twelve inches broad. That is occupy a space in the diameter
of the wheel of twelve inches, & are eleven in number. The buckets
are to be made of blocks of wood carved, a block for each bucket,
the length of which is half the diameter of the wheel, or the radius of a
circle of five feet diameter, the breadth of the block at the circum=
ference, to be six inches broader than one eleventh part of the
circumference of the wheel, being in the form of a wedge, say the
wheel for instance runs to the left or opposite to the course of the sun; let
the blocks be carved in a regular winding manner, from the circumference of
the wheel to the centre, leaving the underside of the back part of the block & the
upper side of the forward part perfect, or as they were when the block was in the in the form of a wedge, so that the eleven blocks will just fit
together & fill the whole circumference of the wheel & make solid
work.— The blocks are to be made in this manner to accommodate
the form of the buckets which are formed of the outer parts of these
blocks.— By curving the blocks of a suitable thickness & of a regular
winding curve, so as to leave the upper & forward edge perfect
and about six inches lapped upon the back part of the bucket im-
mediately before it, & to make the issues for the water on the under
surface three & one half inches wide, & on the upper surface of
the wheel, the buckets form spaces or openings for the reception of the
water to pass in & thro' the wheels of about fifteen inches by twelve. The buckets
should be two inches thick at the top & & one and one fourth inch at the bottom
the water by thus issuing from the bottom of the wheel, propels it upon the
principles of reaction, the same as is witnessed in the common reaction
wheel, with the water issuing at the side, & the water being let on to the
wheel at the upper side & running with the wheel & striking the buckets
at near a right angle in a tangent direction, propels the wheel upon
the principles of the percussion wheel, and the water in passing thro'
the wheel. down the inclined surface or curve of the bucket, by reason
of its gravity also, gives a third impulse to the wheel. The rim of
the wheel is three inches thick.— It may be curved on the outer end of
the blocks when forming the buckets, by making them of a length in addition
to what is above stated sufficient for the thickness of the rim. The blocks
when curved so as to form the buckets may be fastened together
by pins or bolts or otherwise to suit the judgment of the artist build-
-ing the wheel. Above & below the wheel should be placed a two
inch planking made circular & firmly pinned or bolted, to the wheel,
so as to make it strong.— The circumference of this circular plank-
-ing being placed just within the inside of the buckets to the wheel.
The wheel thus constructed is placed upon a shaft of suitable
size to carry the proposed Machinery & should be hung so as to have
no projecting parts to meet the resistance of dead water & may be
hung like the McComb's or reaction wheel & fastened at the bottom
by a by a flat bar of iron passing thro' the shaft under the wheel, for the
wheel to rest upon.— The shaft stands perpendicularly & has a metal
step let into the bottom, with a hole or cup in the lower end of the step
which rests on a pivot of hard metal placed in a piece of timber
under the wheel. It is important that there should be a smooth
hard surface under the wheel, on account of the wheel discharging
the water at its bottom, & where there is no smooth rock, there should
be thick plank or hewn timber placed about eight inches below
the wheel for the water to discharge upon.— On the upper side
of the wheel & round the shaft should be placed a block of wood
as large in circumference as the circular planking of the wheel
it should be sixteen or eighteen inches high above the wheel regu-
larly rounded & tapering up to the shaft.— In case of high heads
of water, this block should be raised 12 inches higher or more as
may be required nearly in a perpendicular manner & then rounded
up regularly to the shaft. This blocking may also be supplied by
a hollow curb in its place, to raise above the head of water in the
forebay, & in case the head should be so high, as to destroy the
percussion of the water on the buckets, then it may be capping
over together with the shute in the common manner of capping
horizontal percussion wheels.— The wheel within the penstock
should be placed within about 15 inches of the forebay & a gateway
opened in the forebay of two & one half feet wide & sufficiently
high to draw the quantity of water necessary to supply the wheel.
The left hand side of the shute should run nearly square from the
forebay to the inner side of the buckets & nearly approaching the
circular block or curb placed on the upper surface of the wheel
so as to conduct the water round the wheel.— The planking of the right
hand side of the shute should extend regularly, to a point opposite
the shaft of the wheel, about fourteen inches, to the right hand of the
outer side of the buckets, making a space of twenty six or seven inches
broad.— Here the right hand side of the shute connects with a cir-
cular curb extending around the wheel & regularly approaching
it it connects with the left hand side of the shute directly over
the outer ends of the buckets, on the inner side of the rim & which
rim should be worn at the bottom, with the under side of the wheel
& falling two or two & half inches below the upper ends of them
The floor of the penstock should be four inches thick circled
out & placed round the wheel within three quarters of an inch,
of the outer circumference of the wheel & be placed, just as high
as the upper edge of the rim & then within the curbing around
the wheel, to receive on the top of it a four inch planking to
project over the top of the rim to the outer ends of the buckets, & to
be regularly inclined from the curving to the buckets, as the
strength of the timber will admit. The floor of the shute should
also be regularly inclined from the gateway to the wheel.

N.B. What I claim as new & of my own invention in the above
described wheel is the particular combination, by which the
three principles of percussion, gravity & reaction are used at one
& the same time, & not either of them separately, and the pecu-
liar adaptation of these principles thus combined & put in
practice, by this method of applying the water, to a low head
of water, when there is back, or dead water, or where there is
no back water.

Witnesses

James McConnel

John Mitchell
Wm. French Jr. [illegible]

(1521.)